United States Patent
Riopka et al.

(10) Patent No.: US 11,062,120 B2
(45) Date of Patent: *Jul. 13, 2021

(54) HIGH SPEED REFERENCE POINT INDEPENDENT DATABASE FILTERING FOR FINGERPRINT IDENTIFICATION

(71) Applicant: AWARE, INC., Bedford, MA (US)

(72) Inventors: Taras P. Riopka, Concord, MA (US); Siddharth K. Madan, Billerica, MA (US)

(73) Assignee: AWARE, INC., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,879

(22) Filed: Apr. 28, 2020

(65) Prior Publication Data
US 2020/0257885 A1 Aug. 13, 2020

Related U.S. Application Data

(63) Continuation of application No. 15/757,262, filed as application No. PCT/US2016/059924 on Nov. 1, 2016, now Pat. No. 10,671,831.
(Continued)

(51) Int. Cl.
*G06K 9/00* (2006.01)
*G06K 9/46* (2006.01)
(Continued)

(52) U.S. Cl.
CPC ..... *G06K 9/00093* (2013.01); *G06K 9/00073* (2013.01); *G06K 9/4647* (2013.01);
(Continued)

(58) Field of Classification Search
None
See application file for complete search history.

(56) References Cited

U.S. PATENT DOCUMENTS

| 10,671,831 B2 * | 6/2020 | Riopka .............. G06K 9/00073 |
| 2006/0210170 A1 | 9/2006 | Yumoto et al. |

(Continued)

FOREIGN PATENT DOCUMENTS

| EP | 2354998 | 8/2011 |
| EP | 2354999 | 8/2011 |

(Continued)

OTHER PUBLICATIONS

Bhanu, Bir et al. "Fingerprint Indexing Based on Novel Features of Minutiae Triplets" IEEE Transactions on Pattern Analysis and Machine Intelligence; vol. 25, No. 5, May 2003 (7 pages).

(Continued)

*Primary Examiner* — Sean M Conner
(74) *Attorney, Agent, or Firm* — Jason H. Vick; Sheridan Ross, PC

(57) ABSTRACT

Methods and systems for high-speed filtering of candidate fingerprint images in a gallery using a non-reference-point based matching involving histograms of tokens representing minutia data. The method or system may involve detecting minutia patterns in a probe image, defining tokens that represent the minutia patterns detected in the probe image, measuring a degree of similarity between the probe image and each gallery image by comparing a probability of occurrence of a set of the tokens defined for the probe image with a probability of occurrence of the same set of tokens in that gallery image, and identifying as a candidate for a match to the probe image each gallery image for which the measured degree of similarity satisfies a criterion.

20 Claims, 8 Drawing Sheets

Related U.S. Application Data

(60) Provisional application No. 62/249,475, filed on Nov. 2, 2015.

(51) Int. Cl.
    *G06K 9/62* (2006.01)
    *G06T 7/44* (2017.01)

(52) U.S. Cl.
    CPC ......... *G06K 9/6215* (2013.01); *G06K 9/6255* (2013.01); *G06T 7/44* (2017.01)

(56) References Cited

U.S. PATENT DOCUMENTS

| 2009/0285459 | A1* | 11/2009 | Aggarwal | G06K 9/00073 382/125 |
|---|---|---|---|---|
| 2014/0270420 | A1 | 9/2014 | Boshra | |
| 2016/0225119 | A1 | 8/2016 | Xu et al. | |
| 2018/0247105 | A1 | 8/2018 | Riopka et al. | |

FOREIGN PATENT DOCUMENTS

| JP | 2012-519928 | 8/2012 |
|---|---|---|
| WO | WO 2010/104885 | 9/2010 |

OTHER PUBLICATIONS

Cappelli, Raffaele et al. "Short Papers: Fingerprint Indexing Based on Minutia Cylinder-Code" IEEE Transactions on Pattern Analysis and Machine Intelligence; vol. 33, No. 5; May 2011.

Farooq, Faisal et al. "Anonymous and Revocable Fingerprint Recognition" IEEE Computer Society Conference on Computer Vision and Pattern Recognition Proceedings; Jun. 2007.

He, Shihua et al. "Clustering-Based Descriptors for Fingerprint Indexing and Fast Retrieval" Lecture Notes in Computer Science, Springer, DE; Sep. 23, 2009.

Jain, Anil K, et al. "An Identity-Authentication System Using Fingerprints" Proceedings of the IEEE, vol. 85, No. 9; Sep. 1997.

Neumann, Cedric et al. "Computation of Likelihood Ratios in Fingerprint Identification for Configurations of Any Number of Minutiae" J Forensic Sci.; vol. 52, No. 1; Jan. 2007.

Ratha, Nalink K. "Generating Cancelable Fingerprint Templates" IEEE Transactions on Pattern Analysis and Machine Intelligence, vol. 29, No. 4; Apr. 2007.

International Search Report for International Application No. PCT/US2016/059924, dated Jan. 5, 2017.

Written Opinion for International Application No. PCT/US2016/059924, dated Jan. 5, 2017.

International Preliminary Report on Patentability for International Application No. PCT/US2016/059924, dated May 17, 2018.

Office Action for European Application No. 16794888.4, dated Jul. 1, 2019.

Office Action for U.S. Appl. No. 15/757,262, dated Sep. 30, 2019.

Notice of Allowance for U.S. Appl. No. 15/757,262, dated Feb. 5, 2020.

Office Action for European Application No. 16794888.4, dated Jul. 16, 2020.

Philbin, James et al. "Object Retrieval with Large Vocabularies and Fast Spatial Matching" 2007 IEEE Conference on Computer Vision and Pattern Recognition, Minneapolis, MN, Jun. 1, 2007, pp. 1-8.

Office Action for European Application No. 16794888.4, dated Dec. 21, 2020.

* cited by examiner

HIGH SPEED REFERENCE POINT INDEPENDENT DATABASE FILTERING FOR FINGERPRINT IDENTIFICATION

RELATED APPLICATION DATA

This application is a continuation of U.S. patent application Ser. No. 15/757,262, filed Mar. 2, 2018, now U.S. Pat. No. 10,671,831, which is a national stage application under 35 U.S.C. 371 of PCT Applications No PCT/US2016/059924, filed Nov. 1, 2016, which designated the United States, which PCT application claims the benefit under 35 U.S.C. § 119(e) of U.S. Provisional Patent Application No. 62/249,475, filed on Nov. 2, 2015, and entitled "HIGH SPEED REFERENCE POINT INDEPENDENT DATABASE FILTERING FOR FINGERPRINT IDENTIFICATION," each of which are incorporated herein by reference in their entirety.

TECHNICAL FIELD

An exemplary embodiment generally relates to fingerprint identification systems, and more particularly to the use of minutia patterns to filter fingerprint galleries independent of the use of a reference point to at least increase the filtering speed capability of a fingerprint identification system.

BACKGROUND

The prevalent use of computers, smart-phones, tablets, and other electronic devices generates an ever-increasing demand for digital security. Traditional means for securing digital devices include passwords and personal identification numbers (PINs). Such traditional security means are associated with a number of issues, for example passwords and PINs may be stolen, lost, or forgotten.

As electronic devices become more technologically advanced, new means for digital security have been created. Biometric security systems, such as fingerprint-recognition systems, are one approach to digital security. Biometric traits like fingerprints, iris, and face are increasingly being used for identification and access control. The use of biometrics has significant advantages compared to traditional methods like passwords and PINs. Unlike passwords and PINs, biometrics ordinarily cannot be stolen, lost, or forgotten. Among the different biometrics, fingerprints are very popular and have a number of strengths. Fingerprints are unique to every individual, non-invasive to acquire, and do not change with time.

Fingerprint images have a pattern of black and white regions called as ridges and valleys. Ridges correspond to the upper layer of skin on the fingerprint, and valleys correspond to the lower layer of the skin. Depending on the ridge pattern, a fingerprint can be classified to one of five categories: left loop, right loop, arch, tented arch, and whorl. The ridge patterns in loop images enter the fingerprint from one side, form a loop, and exit from the same side. Ridges in arch images start from one side of the finger, form an arch shape in the center region, an exit from the other side. Tented arch images are similar to arches, but the ridges have a sharper rise and are discontinuous in the center region. Whorl images consist of ridges, which turn around by entire 360 degrees.

Example embodiments described herein involve an algorithm for single-finger matching. Other embodiments described herein involve multi-finger matching. Multi-finger matching is similar to single-finger matching, with one additional step of fusing match scores obtained by applying the algorithm on individual fingers. The fusion algorithm can be a simple sum of scores obtained from individual fingers, or a more sophisticated algorithm.

Fingerprint matching problems are of two types, verification and identification. Verification, i.e., one-to-one matching, verifies that a person is who they claim to be. Verification is often done by matching the subject's fingerprints with a previously stored template. Identification, i.e., one-to-many matching, identifies a person by matching his or her fingerprints against a database of fingerprints. The database of fingerprints is called a gallery and the input fingerprint being searched is called a probe. Such a database may be stored on a hard-drive storage system and may be connected to and accessible from a network and/or server. A network connected fingerprint database may allow a number of devices in a number of locations to input probe fingerprints to be matched across a shared database.

Multi-stage matching is often used to search a large database of fingerprints. A first stage of filtering should filter out a larger group of candidates to be searched through in later stages wherein a more accurate search may be performed. Earlier stages typically have a high speed, and pass a small subset of a larger number of candidates to later stages. Later stages typically have a lower speed, and a very high accuracy. The filtering of candidates in the initial stages is often based on a global ridge pattern. Fingerprint images are first aligned using a reference point.

Typically, a core point is used as the reference point. The core point of a fingerprint is defined as the north-most point of the innermost ridge line. Once the images are registered, their ridge pattern is modeled, and used to identify candidates to be passed to the next stage. The candidates are usually fingerprints in which the ridge pattern are of the same category as the probe.

While issues with traditional means for security have been addressed with new means, new methods for digital security, including fingerprint-recognition for example, come with new issues. For example, methods relying on core-point detection and global ridge pattern have a number of limitations. Accurate detection of core-point location is a non-trivial problem, and some fingerprint images, e.g., arch images, do not have a core point. Selecting candidates based merely on the category of the ridge pattern may not result in a high filtering rate, because fingerprints are not evenly distributed between different categories. For example, loop and whorl images constitute nearly 60% and 30% of the total fingerprint images respectively.

BRIEF DESCRIPTION OF THE DRAWINGS

The present disclosure is described in conjunction with the appended figures, which are not necessarily drawn to scale.

DETAILED DESCRIPTION

Figure 1:
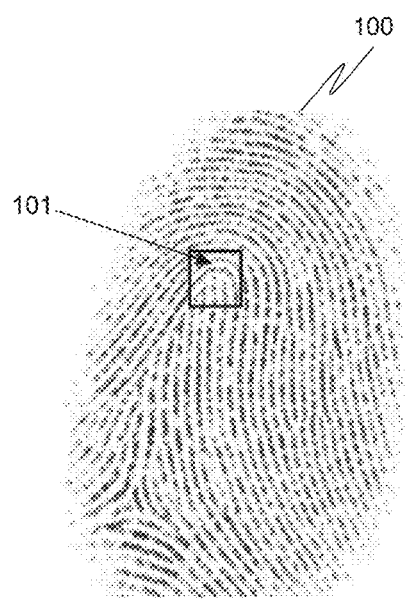
FIG. 1 is a drawing illustrating an example fingerprint with a core point indicated.

The ensuing description provides embodiments only and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Example embodiments described herein propose a reference-point-independent approach to filter the gallery, and select the candidates which will be passed to the later stages. Example embodiments, in contrast to the prior art, do not depend on the accurate detection of a single core point. Example embodiments described herein apply an approach based on identified minutia patterns in fingerprint images.

This method is capable of maintaining a high degree of accuracy in early stages of matching and accomplishes that matching at a much higher speed than traditional methods. This method is far superior in terms of processing requirements compared to that of the prior art as discussed herein.

By improving the efficiency of the processor during each round of sorting and filtering the fingerprint images in the gallery, the processor becomes exponentially more efficient with each and every round of filtering. The method disclosed herein saves time and computer resources, allowing for a greater number of fingerprints to be analyzed and compared to fingerprints in the gallery. As a result, the technique frees up more important resources that can be allocated to improve overall match accuracy downstream in the matching process, thus significantly advancing the state of the art. By sorting and filtering the fingerprint matches at a quicker rate, the system is enabled to more quickly select fingerprint match candidates while saving system resources for other matching routines. By providing a more efficient process, the output of the system can be increased without requiring an increase in the performance capabilities of the system processor. The method provided herein lowers the number of steps required for a system processor to generate a matching fingerprint image from a gallery, freeing up the system processor to perform other functions or matching other probe fingerprint images to the gallery.

In conventional methods, to detect a fingerprint in a gallery of represented fingerprints which matches an input probe fingerprint, a core point 101 of the probe fingerprint 100, as illustrated in FIG. 1, is used as the reference point. The core point 101 of a fingerprint is defined as the northmost point of the innermost ridge line. Once a number of fingerprint images are registered to a gallery, their ridge pattern is modeled, and the core-point is detected and used to identify candidates to be passed to the next stage. The candidates are typically fingerprints in which the ridge patterns are of the same category as the probe. This conventional method of filtering a fingerprint gallery relies on an accurate detection of the core-point to be used as a reference point. As discussed above, this gallery may be stored on a hard-drive storage device and connected to and accessible from a network and/or server so that it is accessible by a number of user devices.

Described herein is a reference point-independent approach to filtering a gallery of fingerprints and selecting candidates which will be passed to later stages. Example embodiments described herein do not depend on the accurate detection of a single core point. Embodiments described herein are based on minutia patterns in fingerprint images.

An exemplary embodiment of the present disclosure provides a method for high speed filtering of large fingerprint databases during multi-stage matching, to select a subset of candidates, which will be processed by later stages. The method is reference point independent, represents the fingerprint as a sparse vector, and takes advantage of the sparseness to obtain extremely fast matching between two fingerprint images. The method is reference point independent, represents the fingerprint as a vector, and obtains extremely fast matching between two fingerprint images.

Exemplary embodiments of the present disclosure involve a gallery representing a number of fingerprint images. The gallery may be used to verify a probe fingerprint image by matching the probe fingerprint image to one of the fingerprint images represented in the gallery.

Figure 4:
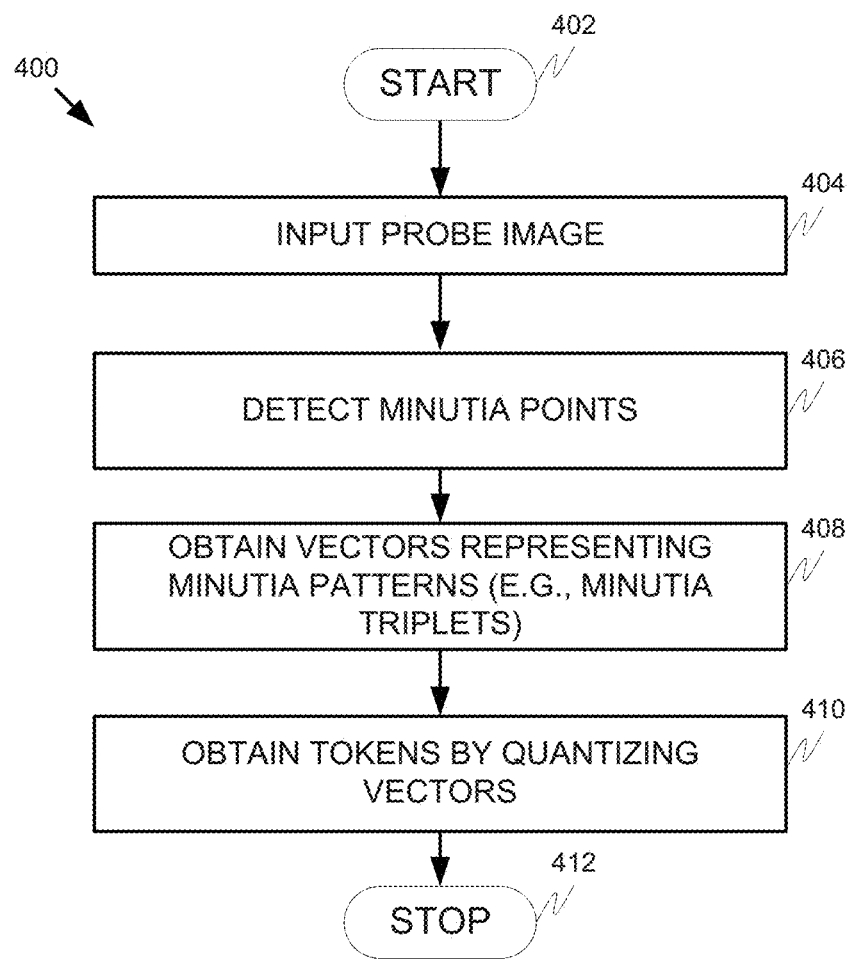
FIG. 4 is a flowchart illustrating a method of obtaining tokens by quantizing vectors from an inputted probe image in accordance with an exemplary embodiment of the disclosure.

Adding a fingerprint image to the gallery is performed in a process called enrollment. The enrollment process of exemplary embodiments is illustrated by the flowchart of FIG. 4. The enrollment process 400 begins at step 402. To enroll a fingerprint, a fingerprint image must be inputted at step 404. A sensor, such as a fingerprint scanner, may be, and is typically, used to acquire the fingerprint image of the subject. The acquired image is transferred to the memory of a device for processing. Examples of devices include, but are not limited to, servers, desktop computers, and embedded systems. The processing unit, e.g., central processing unit (CPU), graphical processing unit (GPU), or field programmable gate array (FPGA), loads the instructions for extracting the features from a storage device.

Figure 3:
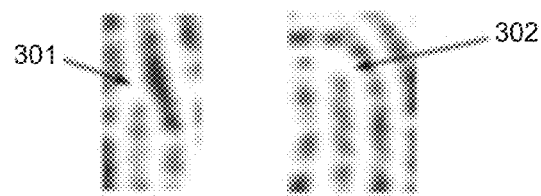
FIG. 3 is a drawing illustrating examples of fingerprint minutia.

Embodiments of the disclosed system use features derived from multiple minutia points. The features do not require the accurate detection of a single reference point. Minutia points in the probe image are detected by a processor, for example, in step 406. Minutia refers to specific patterns formed by ridges of a fingerprint image. FIG. 3 illustrates an example of two types of minutia which commonly occur in fingerprints: ridge ending minutia 302 and ridge bifurcation minutia 301. Ridge ending minutia 302 is defined as the end point of a ridge, and ridge bifurcation minutia 302 is defined as a split in the ridge pattern such that two ridges join together or split apart. The disclosed embodiments, by using minutia patterns to filter fingerprint galleries, is robust to variation in minutia pattern between different impressions of a fingerprint, and is capable of a very high search speed as compared to traditional methods.

The quantization levels are defined as tokens, and symbolize the presence of a particular minutia pattern in the fingerprint image. Tokens may be used as features for describing the fingerprint image. The instructions process the image in memory, to generate tokens occurring in the particular image. The set of all possible token values is called as token-set.

Features, called tokens, may be simple integers representing minutia information in the fingerprint. The process may begin by defining vectors, which describe the minutia pattern in the image. The vectors can be defined in different ways. For example, the vectors can describe minutia triplets in the fingerprint impression using triangle lengths, ridge count between every pair of minutia points in the triplet, and minutia angle at each vertex. For example, the minutia patterns may be divided into M categories, and the tokens can be integers values representing the categories of the different minutia patterns in the fingerprint image. The vectors are quantized to one of M quantization levels in the d dimensional space, where d is the dimension of the vector. In this way, fingerprints may be represented as sets of integers and/or histograms, allowing for easier storage and easier comparison and analysis for verification purposes.

Figure 2A:
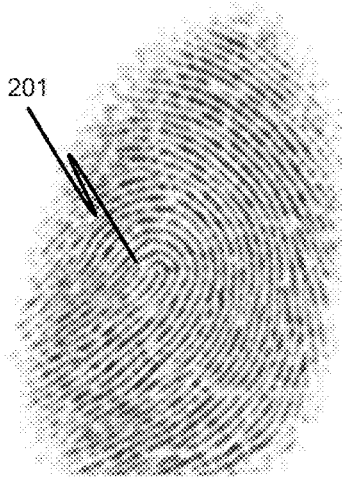
FIG. 2A is a drawing illustrating an example fingerprint.
Figure 2B:
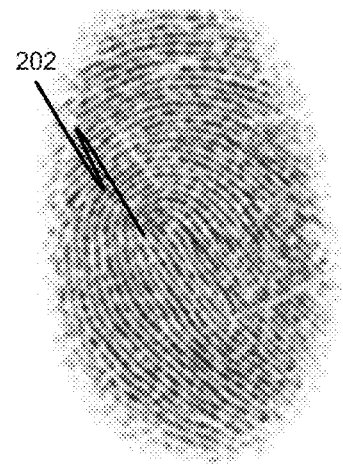
FIG. 2B is a drawing illustrating an example fingerprint.
Figure 2C:
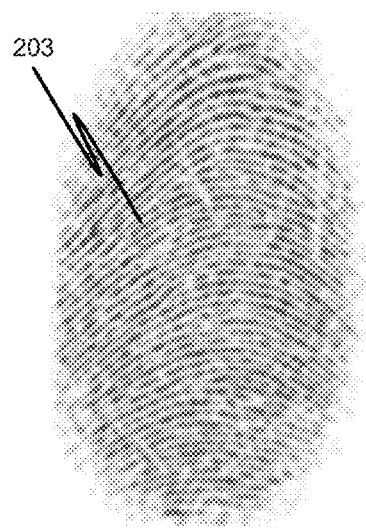
FIG. 2C is a drawing illustrating an example fingerprint.
Figure 2D:
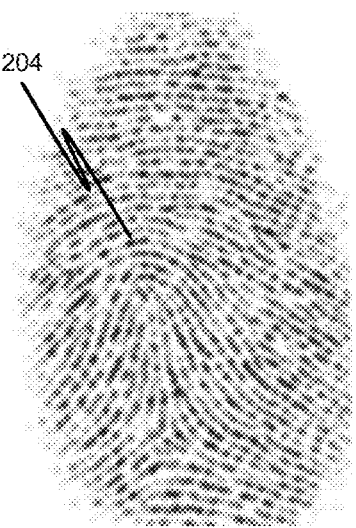
FIG. 2D is a drawing illustrating an example fingerprint.
Figure 2E:
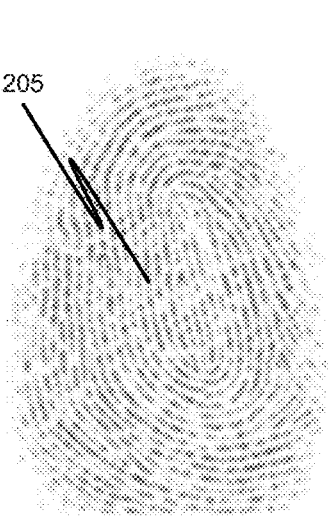
FIG. 2E is a drawing illustrating an example fingerprint.

In FIGS. 2A-2E, five categories of fingerprint images based on ridge patterns are illustrated. In FIG. 2A, a left loop category 201 is illustrated. In FIG. 2B, a right loop category 202 is illustrated. In these categories, the fingerprints contain ridges which enter from one side, form a loop, and exit from the same side. FIG. 2C illustrates a fingerprint of the plain arch 203 category. FIG. 2D illustrates a fingerprint of the tented arch 204 category. In these categories, the fingerprints contain ridges which enter from one side, form an arch in the center and leave from the other side. Tented arches have a sharper rise and are discontinuous in the center. The whorl category is illustrated in FIG. 2E and contains ridges 205 which turn around by an entire 360 degrees.

Fingerprint images are represented in the gallery using the tokens present in the image. The set of all possible token values is called as token-set. The size of the token-set is the number of quantization levels, M, and is chosen to be much larger than the number of tokens typically occurring in a fingerprint image. As the tokens in a fingerprint image are identified, the frequency of occurrence of each token in the fingerprint image is measured so that a normalized histogram, showing the amount of each token as compared to the total number of tokens in the image, may be created. A normalized histogram gives the probability of occurrence of each token in the fingerprint image. Each fingerprint image in the gallery, as well as the probe fingerprint, may be represented as an M-dimensional normalized histogram, h. The frequency of occurrence of each token may be normalized by the total number of tokens occurring in the fingerprint. The $i^{th}$ component, $h_i$, of the histogram may be represented by, $h_i = n_i/N$, where $n_i$ represents the number of times token i occurs in the fingerprint and N is the total number of tokens in the image. The normalized frequency, $h_i$, gives the probability of occurrence of each token in the fingerprint image. The image is represented by the normalized histogram, h, of probability of occurrence of each token in the fingerprint image.

In FIG. 4, a flowchart illustrating the enrollment process, wherein fingerprint features are extracted from fingerprint images, is illustrated. Vectors may be used to represent minutia patterns in fingerprint image. The vectors are quantized to one of M quantization levels, called as tokens. Tokens may be used as features to describe the image. Set of all possible token values is called as token-set. The method 400 begins at step 402 and moves to step 404 where a probe image is input. Next, at step 406, the method involves detecting minutia points in the probe image. Next, at step 408, vectors representing patterns of the minutia points are generated. Finally, at step 410, tokens are obtained by quantizing the vectors representing the minutia patterns. The method ends at step 412.

Figure 5A:
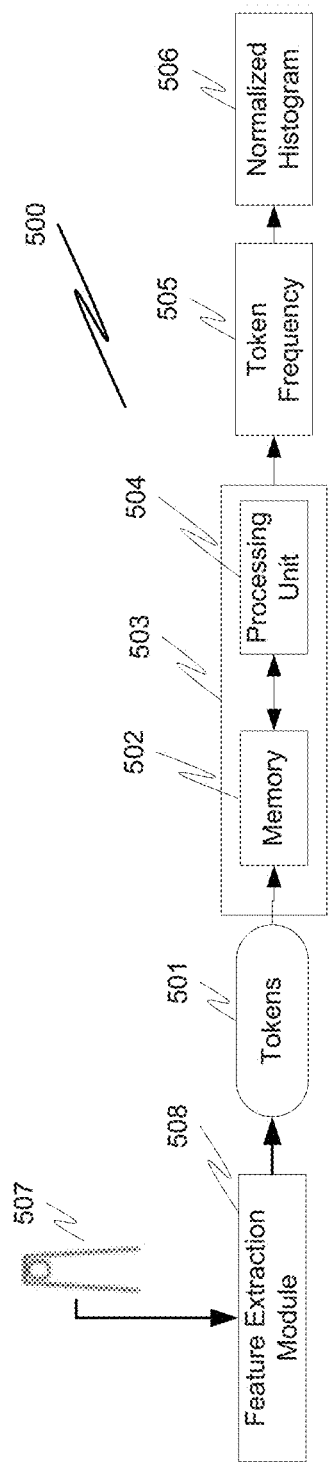
FIG. 5A is a functional block diagram illustrating a method of obtaining a normalized histogram from a fingerprint in accordance with an exemplary embodiment of the disclosure.
Figure 5B:
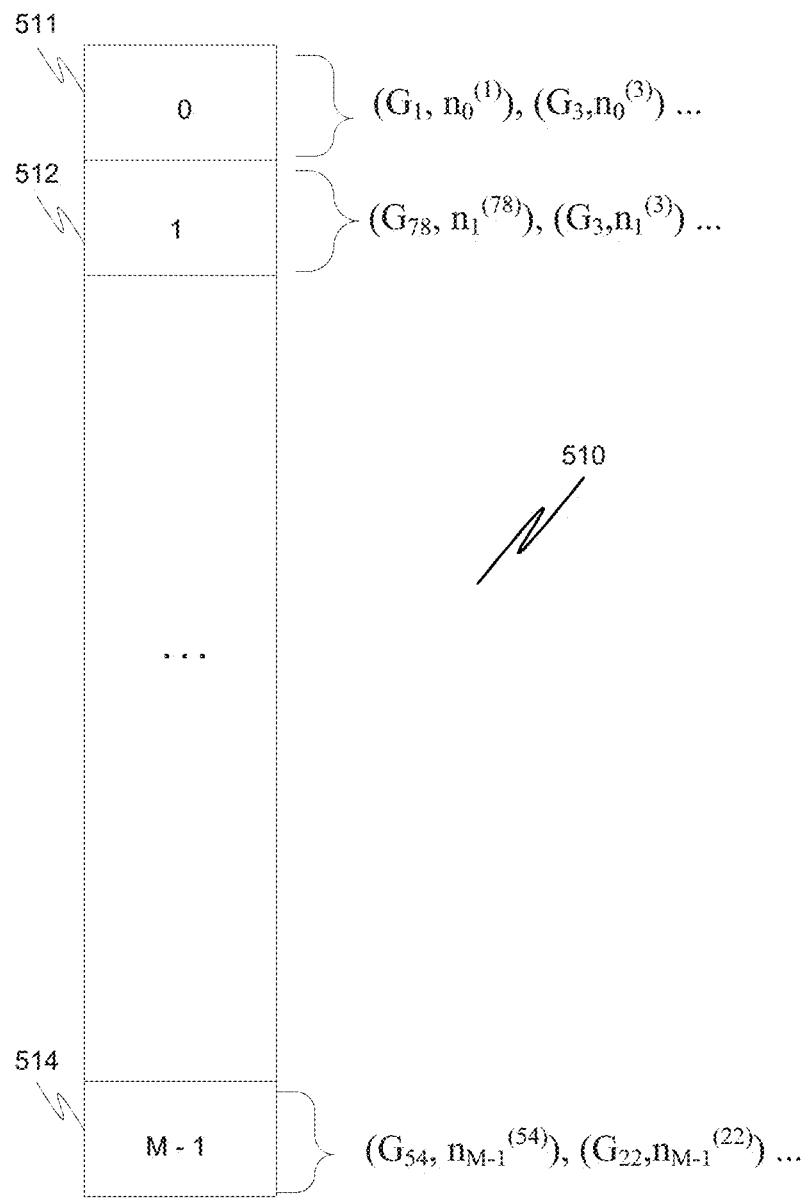
FIG. 5B is an overview illustration of a gallery index table in accordance with an exemplary embodiment of the disclosure.

FIG. 5A shows a functional block diagram 500 of matching the input probe fingerprint against a gallery of enrolled fingerprints. An example gallery 510 is illustrated in FIG. 5B. The matching process is summarized in the flowchart in FIGS. 6A and 6B.

Fingerprint identification includes an enrollment step and a verification step. In the enrollment step, one or more fingerprints are added to the gallery, and in the verification step the probe fingerprint image is matched against fingerprints in the gallery. During enrollment, features from each fingerprint image are extracted to be added to the gallery.

As illustrated in FIG. 5A, when an input probe fingerprint 507 is to be matched against a gallery of enrolled fingerprints, tokens 501 in the input probe fingerprint are detected using a sensor and a feature extraction module 508 and input into memory 502 of a computing device 503. This feature extraction module 508 may be a function of a processor of the computing device 503 or another computing device. These tokens 501 may be stored in memory in the form of a list or set of integers representing the tokens 501 of the input probe fingerprint; however, in general, the tokens can be stored in any form. As an example, if an input probe fingerprint contains one instance of token zero, two instances of token one, and four instances of token three, the tokens 501 input into the memory 502 may be a list or histogram such as [0, 1, 1, 3, 3, 3, 3]. As the list of tokens 501 is input into the memory 502, a processing unit 504 is operable to read the probability of occurrence of the tokens in each gallery fingerprint from a database 505 which stores token frequency information. For each gallery fingerprint, the token probabilities in the gallery fingerprints and the probability of occurrence of each token in the probe fingerprints are compared to generate a match score summarized in a normalized histogram 506.

The feature extraction module 508, which may be a function of a processor of a computing device, obtains the tokens occurring in the probe image, and the normalized histogram representation, which is stored in the memory 502 associated with the processing unit 504. The normalized histogram representations of the gallery fingerprints are stored in a database, and loaded into memory. The processing unit accesses the normalized histogram representations of the probe and gallery fingerprints.

The match score, with each gallery fingerprint, is generated by comparing the probability of occurrence of the different tokens in the probe and the gallery. Two impressions of the same finger will have similar minutia distribution; thus the probability of occurrence of each token in the two impressions will be similar. The match score between two fingerprint images may be defined as a measure of similarity of the probability of occurrence of every token such that the closer the fingerprint images resemble each other, the higher the score. The probabilities are represented in the normalized histograms of the two fingerprints, and the degree of similarity in the probability distribution is obtained by measuring the similarity of the histograms. The similarity, s, between two fingerprint images may be measured as a dot product between their histogram representation, $$s = \frac{h_1^T h_2}{\|h_1\|\|h_2\|} = \frac{(n_0^{(1)} \times n_0^{(2)} + n_1^{(1)} \times n_1^{(2)} + \ldots + n_{M-1}^{(1)} \times n_{M-1}^{(2)})}{N_1 N_2 \|h_1\| \|h_2\|} \quad \text{(equation 1)}$$

$$\text{where } h_1 = \frac{1}{N_1}[n_0^{(1)}, n_1^{(1)}, \ldots, n_{M-1}^{(1)}]^T \text{ and}$$

$$h_2 = \frac{1}{N_2}[n_0^{(2)}, n_1^{(2)}, \ldots, n_{M-1}^{(2)}]^T$$

are the normalized histogram representation of the two images, $n_i^{(1)}$ and $n_i^{(2)}$ denote the frequency of occurrence of token i in the two images, and $N_1$ and $N_2$ denote the total number of tokens in the two images. It can be shown that maximizing the similarity measure is equivalent to minimizing the $L_2$ norm of the difference between the histogram representation of the two fingerprint images.

FIG. 5B illustrates gallery information stored in an index table 510 as may be stored on a hard-drive which may be network connected and/or accessible by a server. Row i of the index table contains IDs representing all gallery subjects containing token i and the frequency of occurrence of the token in each subject. As can be appreciated from FIG. 5B, the token zero set 511 of the gallery index 510 contains at least $G_1$ and $G_3$. This represents the fact that $G_1$ contains $n_0^{(1)}$ instances of token zero, while $G_3$ contains $n_0^{(3)}$ instances of token zero. Similarly, the token one set 512 of the gallery index 510 contains at least $G_{78}$ and $G_3$. This represents the fact that $G_{78}$ contains $n_1^{(78)}$ instances of token one, while $G_3$ contains $n_1^{(3)}$ instances of token one. The gallery index may contain a set number of tokens, known as a token set. The token set of FIG. 5B comprises M individual tokens, represented by M-1 514. The final token, token M-1, 514 of the gallery index 510 contains at least $G_{54}$ and $G_{22}$. This represents the fact that $G_{54}$ contains $n_{M-1}^{(54)}$ instances of token M-1, while $G_{22}$ contains $n_{M-1}^{(22)}$ instances of token M-1.

Much more efficient similarity scores can be computed by reorganizing the sparse histogram fingerprint data structure into a data structure that iterates over tokens instead of subjects. In this way, an index table as shown in FIG. 5B may be built. The index table has M rows, corresponding to the number of tokens in the token set. Row i of the index table stores information corresponding to token i. In particular, row i has the IDs of all gallery subjects containing token i, and the frequency of occurrence of the token in each subject.

Figure 5C:
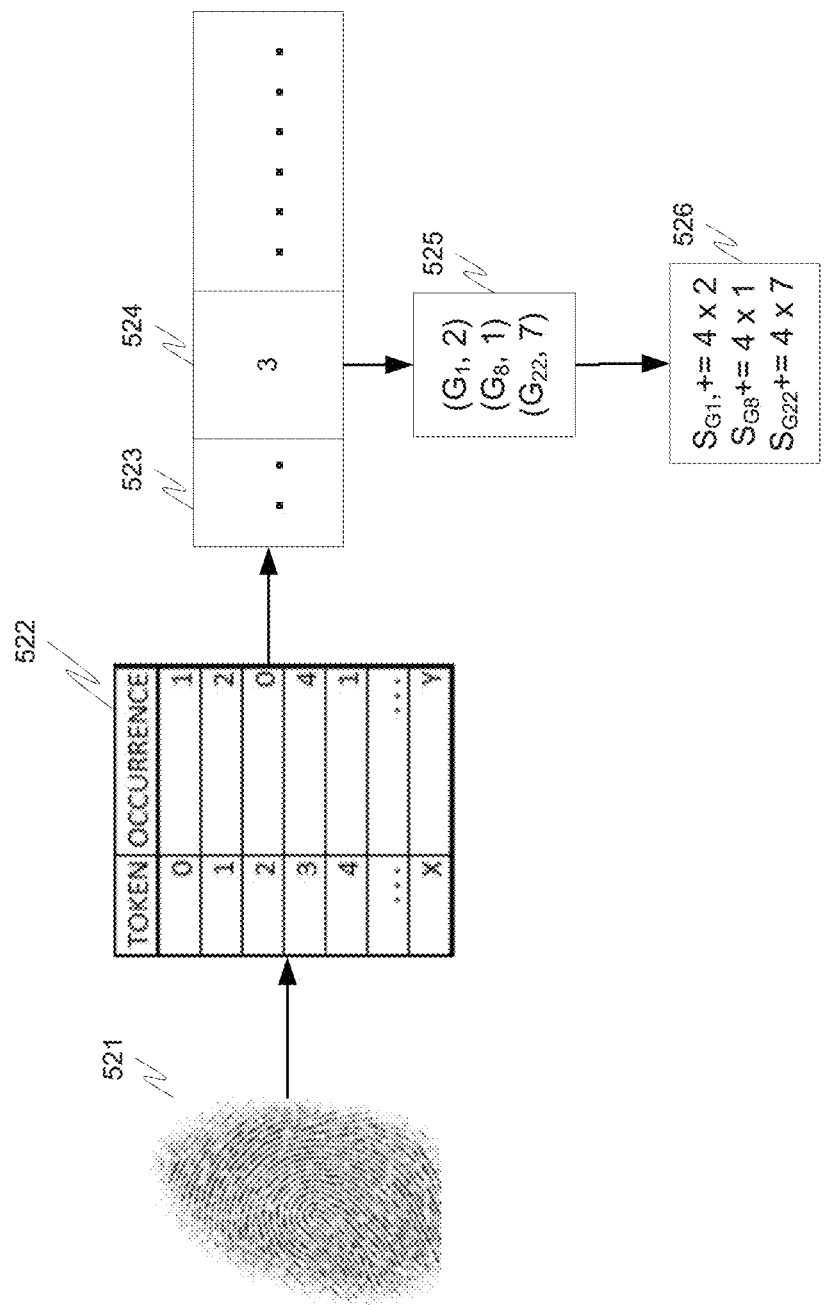
FIG. 5C is an illustration of a histogram created from a probe fingerprint and the calculation of match scores from an index table summarizing a gallery of fingerprints in accordance with an exemplary embodiment of the disclosure.

An overview of the matching process is illustrated in FIG. 5C. As can be appreciated, an input probe fingerprint 521 is converted into a histogram 522 illustrating the number of occurrences of each token in the input probe fingerprint 521. In the example shown in FIG. 5C, as with the example shown in FIG. 5A, the input probe fingerprint 521 includes one instance of token zero, two instances of token one, and four instances of token three. The information regarding the token count is gathered into an input probe histogram 522. The token set of the example in FIG. 5C includes X number of tokens. This input probe histogram is compared to the gallery 523. In this example, the gallery 523 includes a number of fingerprint images containing token three 524. As can be seen in FIG. 5C, three tokens containing token three are in the gallery, i.e. $G_1$, $G_8$, and $G_{22}$ 525. In this example, $G_1$ contains two instances of token three, $G_8$ contains one instance of token three and $G_{22}$ contains seven instances of token three. To calculate the match score of the input probe fingerprint 521 as compared to the fingerprints in the gallery 523, the match scores 526, i.e. $S_{G1}$, $S_{G8}$, and $S_{G22}$, are increased by the number of occurrences of each token in the input probe fingerprint 521 multiplied by the number of occurrences of that token in each gallery fingerprint. In this example, the input probe fingerprint includes four instances of token three, thus the match score 526 of the input probe fingerprint 521 with $G_1$ is increased by four times the two instances of token three in $G_1$, i.e. increased by eight. This process is repeated for every fingerprint image in the gallery to determine match scores for each, and is repeated for each token in the input probe fingerprint 521 as listed in the input probe histogram 522. In this example, for token three, the match scores of $G_1$, $G_8$, and $G_{22}$ are each increased by eight, four, and twenty-eight, respectively.

Stepping through the rows gives the list of identifiers (IDs), $G_j$, of gallery subjects in which the token occurs and the frequency, $n_t^{(Gj)}$, of occurrence. Equation 1 implies that $n_t^{(P)}$ and $n_t^{(Gj)}$ contributes a value of $n_t^{(P)} \times n_t^{(Gj)}$ to the score between the probe and the gallery subject $G_j$; thus the match score with $G_j$ is increased by $n_t^{(P)} \times n_t^{(Gj)}$.

Figure 6A:
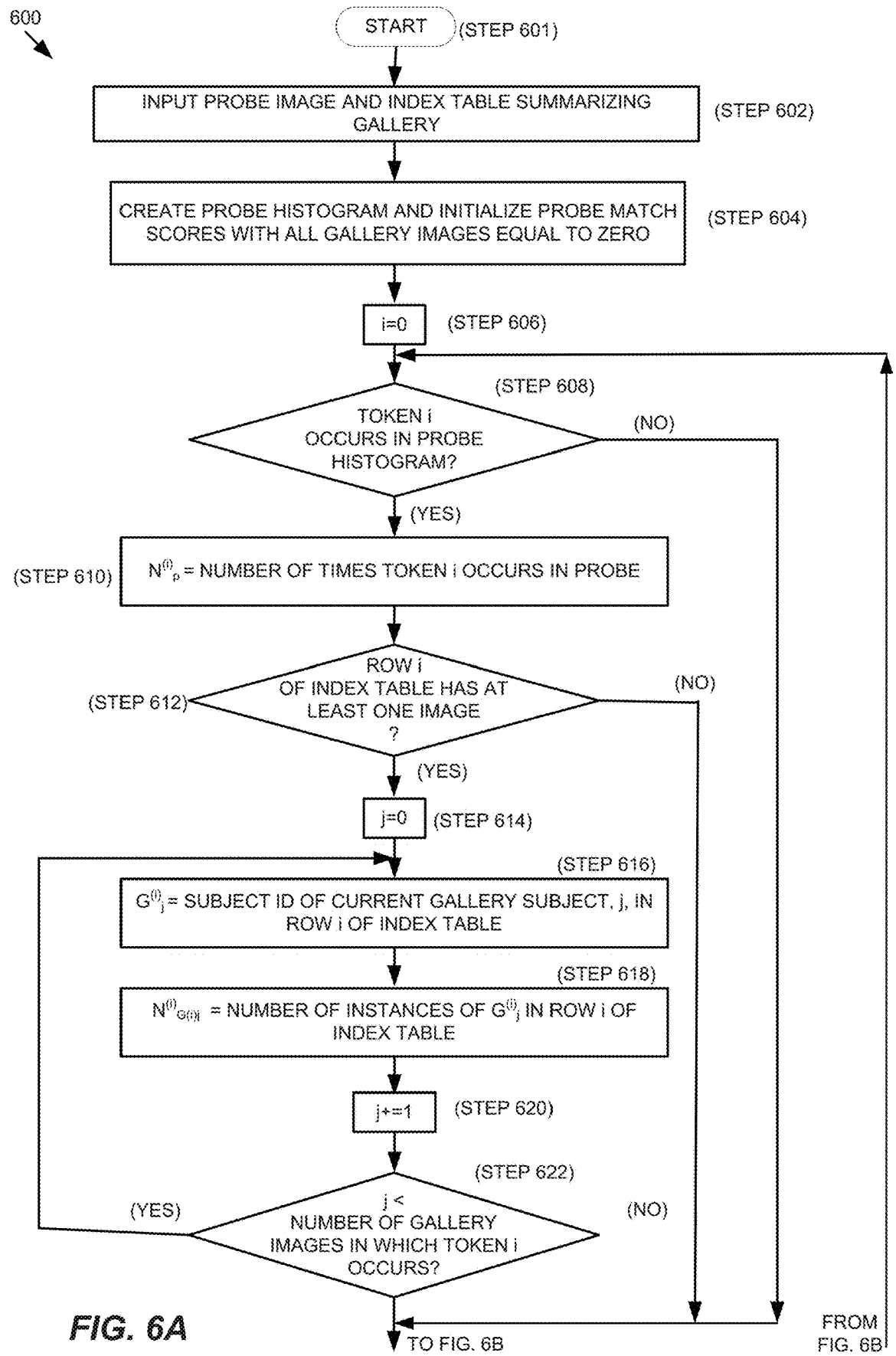
FIG. 6A is a flowchart illustrating a beginning portion of a method of calculating a normalized histogram provided a probe image and an index table summarizing a gallery of fingerprints in accordance with an exemplary embodiment of the disclosure.
Figure 6B:
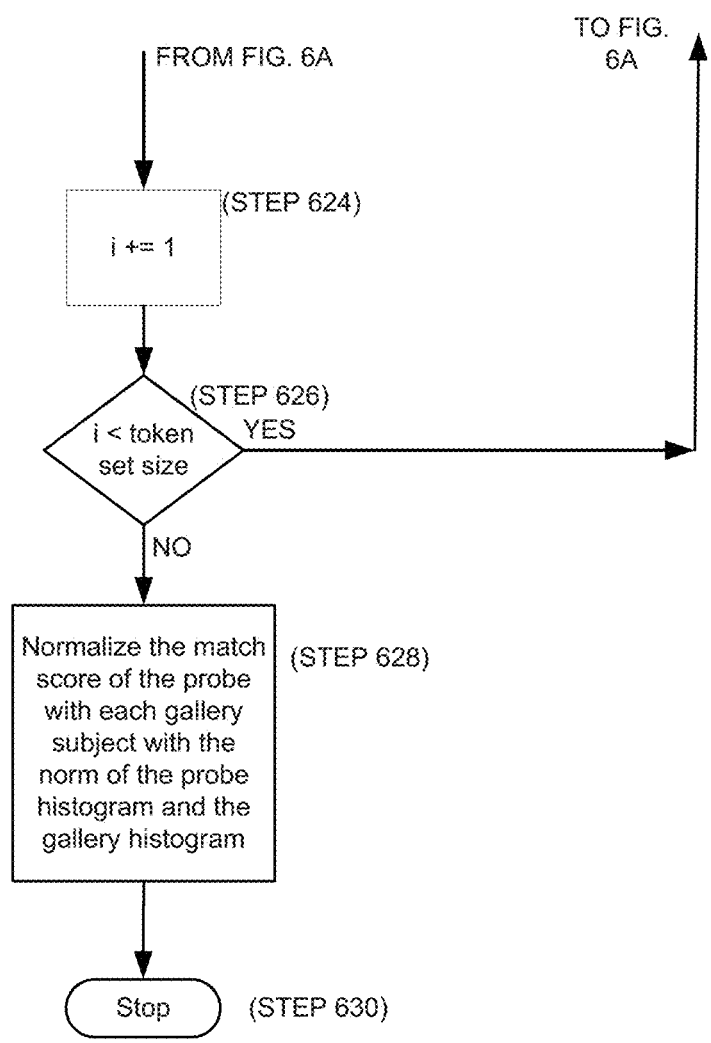
FIG. 6B is a flowchart illustrating an ending portion of a method of calculating a normalized histogram provided a probe image and an index table summarizing a gallery of fingerprints in accordance with an exemplary embodiment of the disclosure.

FIGS. 6A and 6B give a flowchart representation of an exemplary embodiment method 600 of matching a probe input fingerprint with a gallery of fingerprints. This method may be performed by one or more processors of a computing device, for example by a server connected to or containing a hard drive storing a gallery of fingerprints, or a user device through which a probe fingerprint is input. During matching, all the tokens occurring in the probe may be iterated over by a processor. This iterative process may involve stepping through each row in the index table corresponding to each token, t, occurring in the probe with frequency $n_t^{(P)}$.

The method 600 begins at step 601 and proceeds to step 602 in which a probe image of the input probe fingerprint as well as an index table summarizing the gallery are input into a computing device. At step 604 a probe histogram is created for the input probe fingerprint from the input probe image and match scores for the input probe image with each of the images in the gallery are created and initialized with a value of zero.

At step 606, a counter representing the current token number is initialized with a value of zero. In this way, the first token number is zero and through a series of iterations, the match scores are calculated on a token-by-token basis from zero to the number of tokens in the token set minus one. In step 608, the system determines whether token i occurs in the probe histogram. If not, the method skips ahead and counter i is increased by one in step 624. If token i does occur in the probe histogram, the system determines the number of times the token i occurs in the probe histogram at step 610. This number is represented by $N^{(i)}_P$. Next, the system determines whether row i of the gallery contains at least one image ID at step 612. Step 612 essentially determines whether any fingerprint image represented in the gallery contains at least one instance of token i. If no image ID is contained in row i of the gallery, i.e., no fingerprint image represented in the gallery contains at least one instance of token i, the method skips ahead and counter i is increased by one in step 624. If, on the other hand, row i of the index table has at least one image, the method moves to step 614 in which a second counter, j, is initialized at zero.

Next, the method moves to step 616 in which the system determines the subject ID of the current gallery subject, i.e. subject j, in row i of the index table. This subject ID may be represented as $G^{(i)}_j$. Next, in step 618, the number of instances of $G^{(i)}j$ in row i of the index table, which is represented as $N^{(i)}_{G(i)j}$. The method continues in step 620 in which the second counter, j, is increased by one and, if j is less than the number of gallery images in which token i occurs (step 622) the method returns to step 616. The method continues through steps 616, 618, 620, and 622 until j equals the number of gallery images in which token i occurs, at which point the method continues to step 624, in FIG. 6B, and the counter i is increased by one. At step 626, the system determines whether i is less than the total token set size, i.e. whether any tokens and any rows have not been counted. If i is less than the total token set size, the method returns to step 608 to count the next token. If i is equal to or greater than the token set size, the method continues with step 628, in which the match score of the probe with each gallery subject is normalized with the norm of the probe histogram and the gallery histogram. Finally, the method concludes at step 630, having calculated the normalized match score for the probe with each gallery subject.

This normalized match score can at least be used to select a fingerprint from the gallery matching the probe fingerprint, or otherwise used to select a number of fingerprints from the gallery as candidates for a fingerprint matching the probe. In this way, the match score may be used to identify whether the donor of the probe fingerprint has matching or near matching fingerprints in the gallery. By sorting the fingerprints in the gallery based on match score, an operator of the gallery will be enabled to quickly and easily identify a set of candidate fingerprints from the gallery.

For example, as shown in FIG. 5C, suppose token 3 occurs in the probe four times, and in gallery subject $G_1$ 2 times, $G_8$ 1 time, and $G_{22}$ 7 times. Let $S_{G1}$, $S_{G8}$, and $S_{G22}$ be the scores of the probe with G1, G8, and G22 respectively. The presence of token 3 in the probe and gallery images contributes 4×2, 4×1, and 4×7 to the score with $G_1$, $G_8$, and $G_{22}$; thus the scores with the gallery subjects are incremented as: $S_{G_1}+=4\times2$; $S_{G_8}+=4\times1$; $S_{G_{22}}+=4\times7$.

As the different tokens occurring in the probe are iterated over, the part of the score with the gallery subject due to the presence of the token in the gallery image is obtained, and the score value with the gallery subjects is increased. Finally, after iterating over all the tokens, the score with each gallery subject may be normalized by the norm of the probe and gallery subject histograms.

Once the scores of the probe with the gallery images are determined, the scores may be sorted in descending order. A small subset of gallery subjects corresponding to the top P scores is selected and passed them to the next stage of the multi-stage process. The elimination of a large number of gallery subjects by the high speed filtering stage significantly increases the speed of identification.

For purposes of explanation, numerous details are set forth in order to provide a thorough understanding of the present embodiments. It should be appreciated however that the techniques herein may be practiced in a variety of ways beyond the specific details set forth herein. Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a telecommunications network/bioinformatics network.

As will be appreciated from the following description, and for reasons of computational efficiency, the components of the system can be arranged at any location within a distributed network without affecting the operation of the system. Similarly, one or more functional portions of the system could be distributed between a fingerprint device(s) and an associated computing device.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various methods, protocols and techniques according to the disclosure provided herein.

Embodiments disclosed herein may comprise one or more customer devices, a network, one or more servers, and one or more databases. An overview of an embodiment of the system is illustrated in FIG. 7.

In particular, a user of a client device 704 may operate and utilize the device 704 to enter a biometric sample and/or supplementary data, as discussed below. The client device 704 may be in communication with a network 705 or directly in communication with a server 701 and an external storage device 703 via a communications link 702. Functions involved with performing steps of the embodiment may be performed within the server 701. Alternatively, the steps required for an embodiment of the system may be performed entirely within the user device 704.

Figure 7:
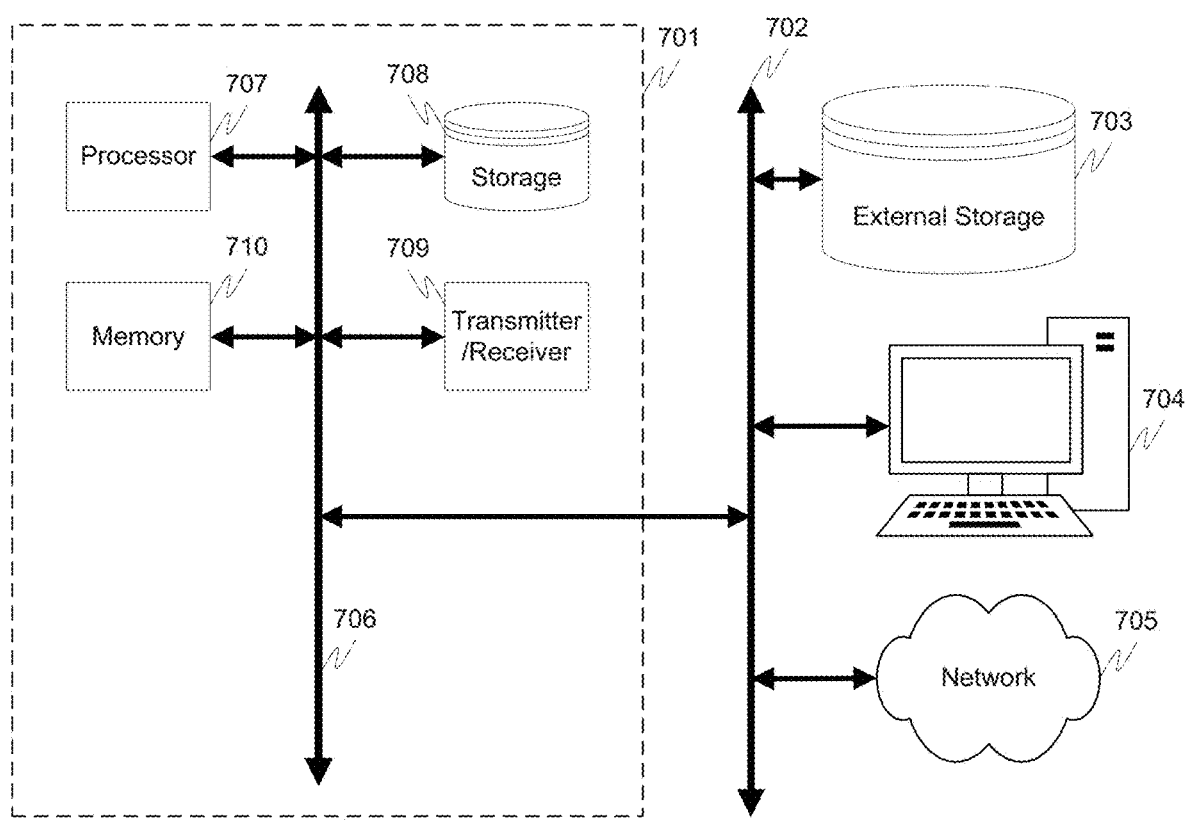
FIG. 7 is an illustration of an example system operable to perform embodiments of the disclosure in accordance with an exemplary embodiment of the disclosure.

An example environment comprising a server performing the steps of the system is illustrated in FIG. 7. Server processor 707 may comprise one or more microprocessors, controllers, or other computing devices or resources interconnected via one or more communication links. The processor may operate alone or in conjunction with other components or additional processor(s) of the system described herein.

Processor 707 may be communicatively coupled to memory 710 via an internal link 706. Memory 710 may take the form of volatile or non-volatile memory including, but not limited to, magnetic media, optical media, random access memory (RAM), read-only memory (ROM), removable media, or any other type of memory component. In some embodiments, memory 710 may be internal or external to the processor 707 and may include instructions to perform the steps of embodiments of the system. In some embodiments the server may further comprise a transmitter/receiver 709 used to communicate with external device, i.e. a client device 704, an external storage device 703 and/or a network 705 as well as an internal storage device 708.

The transmitter/receiver 709 may include any necessary hardware and/or software for sending data signals, control signals, etc. to and from external components and the processor 707. Example embodiments contemplate that the transmitter/receiver 709 may be configured as simple output/input ports or more complex transmitter/receiver circuits having drivers and other associated circuitry, such as circuitry for wireless communication. In some embodiments, the transmitter/receiver 709 are configured to transmit and receive, respectively, signals via wired communications to other elements either via a circuit trace (e.g., via a PCB), an IC trace (e.g., an electrical trace or via established in an IC chip), an external wire, or the like.

Embodiments of the present disclosure may be performed in such a system as illustrated in FIG. 7 in a number of ways. For example, a gallery of fingerprint IDs may be stored on external storage 703 and updated by a client device 704 or via the network 705. A probe fingerprint image may be input into the server 701 via the client device 704. The iterative process illustrated in FIGS. 6A and 6B may be performed, for example, by the processor 707 of the server 701, or via a processor of the client device 704. Match scores may be stored temporarily in the memory 710, the storage 708, the external storage 703, or sent to the client device 704 or to a network location on the network 705. The fingerprint gallery may be updated via the network 705, the client device 704, or via the transmitter/receiver 709.

Exemplary aspects are directed toward:
A method of searching through gallery images for an identification match to a probe image, the method comprising:
detecting minutia patterns in the probe image;
defining tokens that represent the minutia patterns detected in the probe image; measuring a degree of similarity between the probe image and each gallery image by comparing a probability of occurrence of a set of the tokens defined for the probe image with a probability of occurrence of the same set of tokens in that gallery image; and identifying as a candidate for a match to the probe image each gallery image for which the measured degree of similarity satisfies a criterion.

Any of the above aspects, wherein measuring a degree of similarity between the probe image and each gallery image includes:
representing the probe image and each gallery image as sparse M-dimensional histograms, where M is a number of different tokens possibly occurring in the probe image; and
computing a score for each gallery image by performing a dot product of the sparse M-normalized histogram of the probe image with the sparse M-dimensional histogram of that gallery image.

Any of the above aspects, further comprising combining the histograms of the gallery images in a single table having M table entries, wherein each table entry represents a different one of the tokens possibly occurring in the probe image and is associated with a list of zero, one, or more gallery images that contain the possibly occurring token represented by that table entry.

Any of the above aspects, further comprising associating a number with each gallery image appearing in a given list of gallery images associated with a given table entry, the number representing a frequency of occurrence in that gallery image of the token represented by the given table entry.

Any of the above aspects, wherein representing the probe image and each gallery image as sparse M-dimensional histograms includes counting a number of occurrences of each defined token in the probe image and in each gallery image.

Any of the above aspects, wherein computing a score for each gallery image occurs token-by-token for each token occurring in the probe image.

Any of the above aspects, further comprising normalizing the score for each gallery image based on a total number of tokens occurring in the probe image and a total number of tokens occurring in that gallery image.

Any of the above aspects, further comprising:
representing the detected minutia patterns as vectors; and
quantizing each vector to generate one of the defined tokens.

Any of the above aspects, further comprising passing one or more of the identified candidates to a next stage matching process.

Any of the above aspects, wherein passing one or more of the identified candidates to a next stage matching process includes selecting a fixed percentage of the identified candidates.

Any of the above aspects, wherein passing one or more of the identified candidates to a next stage matching process includes selecting each identified candidate with a degree of similarity that exceeds a threshold value.

Any of the above aspects, wherein the probe image and gallery images are fingerprint images.

Any of the above aspects, wherein the fingerprint images are associated with a first finger, and the degree of similarity measured for each gallery image is a first measured degree for that gallery image; and further comprising:
defining tokens that represent the minutia patterns detected in a probe image of a second finger;
measuring a degree of similarity between the probe image of the second finger and each gallery image by comparing a probability of occurrence of a set of the tokens defined for the probe image of the second finger with a probability of occurrence of the same set of tokens in that gallery image; and
fusing, for each gallery image, the first and second measured degrees of similarity.

Any of the above aspects, wherein the detected minutia patterns include ridge bifurcations and ridge endings.

A computer program product for searching through gallery images for an identification match to a probe image, the computer program product comprising:

a non-transitory computer readable storage medium having computer readable program code embodied therewith, the computer readable program code that, if executed:
  detects minutia patterns in the probe image;
  defines tokens that represent the minutia patterns detected in the probe image;
  measures a degree of similarity between the probe image and each gallery image by comparing a probability of occurrence of a set of the tokens defined for the probe image with a probability of occurrence of the same set of tokens in that gallery image; and
  identifies as a candidate for a match to the probe image each gallery image for which the measured degree of similarity satisfies a criterion.

Any of the above aspects, wherein measuring a degree of similarity between the probe image and each gallery image includes:
  representing the probe image and each gallery image as sparse M-dimensional histograms, where M is a number of different tokens possibly occurring in the probe image; and
  computing a score for each gallery image by performing a dot product of the sparse M-normalized histogram of the probe image with the sparse M-dimensional histogram of that gallery image.

A computing system in communication with a database containing gallery images, the computing system comprising:
  memory storing computer readable program code that, if executed, searching through gallery images for an identification match to a probe image; and
  a processor that, in response to executing the computer readable program code stored in the memory:
    detects minutia patterns in the probe image;
    defines tokens that represent the minutia patterns detected in the probe image;
    measures a degree of similarity between the probe image and each gallery image by comparing a probability of occurrence of a set of the tokens defined for the probe image with a probability of occurrence of the same set of tokens in that gallery image; and
    identifies as a candidate for a match to the probe image each gallery image for which the measured degree of similarity satisfies a criterion.

Any of the above aspects, wherein measuring a degree of similarity between the probe image and each gallery image includes:
  representing the probe image and each gallery image as sparse M-dimensional histograms, where M is a number of different tokens possibly occurring in the probe image; and
  computing a score for each gallery image by performing a dot product of the sparse M-normalized histogram of the probe image with the sparse M-dimensional histogram of that gallery image.

Any of the above aspects, further comprising combining the histograms of the gallery images in a single table having M table entries, wherein each table entry represents a different one of the tokens possibly occurring in the probe image and is associated with a list of zero, one, or more gallery images that contain the possibly occurring token represented by that table entry.

Any of the above aspects, further comprising associating a number with each gallery image appearing in a given list of gallery images associated with a given table entry, the number representing a frequency of occurrence in that gallery image of the token represented by the given table entry.

A method of searching through gallery images for an identification match to a probe image, the method comprising:
  means for detecting minutia patterns in the probe image;
  means for defining tokens that represent the minutia patterns detected in the probe image;
  means for measuring a degree of similarity between the probe image and each gallery image by comparing a probability of occurrence of a set of the tokens defined for the probe image with a probability of occurrence of the same set of tokens in that gallery image; and
  means for identifying as a candidate for a match to the probe image each gallery image for which the measured degree of similarity satisfies a criterion.

Any of the above aspects, wherein measuring a degree of similarity between the probe image and each gallery image includes:
  means for representing the probe image and each gallery image as sparse M-dimensional histograms, where M is a number of different tokens possibly occurring in the probe image; and
  means for computing a score for each gallery image by performing a dot product of the sparse M-normalized histogram of the probe image with the sparse M-dimensional histogram of that gallery image.

Any of the above aspects, further comprising means for combining the histograms of the gallery images in a single table having M table entries, wherein each table entry represents a different one of the tokens possibly occurring in the probe image and is associated with a list of zero, one, or more gallery images that contain the possibly occurring token represented by that table entry.

Any of the above aspects, further comprising means for associating a number with each gallery image appearing in a given list of gallery images associated with a given table entry, the number representing a frequency of occurrence in that gallery image of the token represented by the given table entry.

Any of the above aspects, wherein means for representing the probe image and each gallery image as sparse M-dimensional histograms includes means for counting a number of occurrences of each defined token in the probe image and in each gallery image.

Any of the above aspects, wherein computing a score for each gallery image occurs token-by-token for each token occurring in the probe image.

Any of the above aspects, further comprising means for normalizing the score for each gallery image based on a total number of tokens occurring in the probe image and a total number of tokens occurring in that gallery image.

Any of the above aspects, further comprising:
  means for representing the detected minutia patterns as vectors; and
  means for quantizing each vector to generate one of the defined tokens.

Any of the above aspects, further comprising means for passing one or more of the identified candidates to a next stage matching process.

Any of the above aspects, wherein means for passing one or more of the identified candidates to a next stage matching process includes means for selecting a fixed percentage of the identified candidates.

Any of the above aspects, wherein means for passing one or more of the identified candidates to a next stage matching process includes means for selecting each identified candidate with a degree of similarity that exceeds a threshold value.

Any of the above aspects, wherein the probe image and gallery images are fingerprint images.

Any of the above aspects, wherein the fingerprint images are associated with a first finger, and the degree of similarity measured for each gallery image is a first measured degree for that gallery image; and further comprising:
- means for defining tokens that represent the minutia patterns detected in a probe image of a second finger;
- means for measuring a degree of similarity between the probe image of the second finger and each gallery image by comparing a probability of occurrence of a set of the tokens defined for the probe image of the second finger with a probability of occurrence of the same set of tokens in that gallery image; and
- means for fusing, for each gallery image, the first and second measured degrees of similarity.

Any of the above aspects, wherein the detected minutia patterns include ridge bifurcations and ridge endings.

Any one or more of the aspects as substantially described herein.

It should be understood that example embodiments are not limited to the structure of the server 701 shown in FIG. 7. For example, the server 701 may be implemented by a digital state machine comprising digital components such as logic gates. As another example, the server 701 may be implemented as an application specific integrated circuit (ASIC).

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized.

The systems, methods and protocols illustrated herein can be implemented in hardware and/or software using any known or later developed systems or structures, devices and/or software by those of ordinary skill in the applicable art from the functional description provided herein and with a general basic knowledge of the computer and bioinformatics arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a fingerprint device.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for reference point independent database filtering. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A method comprising:
- detecting, by a processor, minutia patterns in a probe image;
- defining, by the processor, one or more tokens that represent the minutia patterns detected in the probe image, wherein the minutia patterns are divided into a number of categories, and the tokens represent the categories of the different minutia patterns in the probe image and further wherein the detected minutia patterns are represented as vectors, and each vector is quantized to generate one of the defined tokens;
- measuring, by the processor, a degree of similarity between the probe image and each gallery image by comparing a probability of occurrence of a set of the tokens defined for the probe image with a probability of occurrence of the set of tokens in that gallery image, wherein measuring the degree of similarity between the probe image and each gallery image includes: representing the probe image and each gallery image as normalized sparse M-dimensional histograms, where M is a number of different tokens possibly occurring in the probe image, and computing a score for each gallery image by performing a dot product of the sparse M-dimensional histogram of the probe image with the sparse M-dimensional histogram of that gallery image;

combining the sparse M-dimensional histograms of the gallery images in a single table having M table entries, wherein each table entry stores a particular one of the tokens possibly occurring in the probe image, and a frequency of occurrence of the particular one of the tokens in each gallery subject; and identifying and outputting, by the processor, an indication of a candidate for a match to the probe image each gallery image for which the measured degree of similarity satisfies a criterion.

2. The method of claim 1, wherein a similarity between two fingerprint images is measured as a dot product between their histogram representation.

3. The method of claim 2, wherein each table entry is associated with a list of zero, one, or more gallery images that contain the possibly occurring token represented by that table entry.

4. The method of claim 3, further comprising associating a number with each gallery image appearing in a given list of gallery images associated with a given table entry, the number representing the frequency of occurrence in that gallery image of the token represented by the given table entry.

5. The method of claim 2, wherein representing the probe image and each gallery image as sparse M-dimensional histograms includes counting a number of occurrences of each defined token in the probe image and in each gallery image.

6. The method of claim 2, wherein computing a score for each gallery image occurs token-by-token for each token occurring in the probe image.

7. The method of claim 2, further comprising normalizing the score for each gallery image based on a total number of tokens occurring in the probe image and a total number of tokens occurring in that gallery image.

8. The method of claim 1, wherein the method is reference point independent, or vectors can describe minutia triplets in a fingerprint impression using triangle lengths, ridge count between every pair of minutia points in the triplet, and minutia angle at each vertex.

9. The method of claim 1, further comprising passing one or more of the identified candidates to a next stage matching process.

10. The method of claim 9, wherein passing one or more of the identified candidates to the next stage matching process includes selecting a fixed percentage of the identified candidates.

11. The method of claim 9, wherein passing one or more of the identified candidates to the next stage matching process includes selecting each identified candidate with a degree of similarity that exceeds a threshold value.

12. The method of claim 1, wherein the probe image and gallery images are fingerprint images.

13. The method of claim 12, wherein the fingerprint images are associated with a first finger, and the degree of similarity measured for each gallery image is a first measured degree for that gallery image; and further comprising:

defining tokens that represent the minutia patterns detected in a probe image of a second finger;

measuring a degree of similarity between the probe image of the second finger and each gallery image by comparing a probability of occurrence of a set of the tokens defined for the probe image of the second finger with a probability of occurrence of the same set of tokens in that gallery image; and fusing, for each gallery image, the first and second measured degrees of similarity.

14. The method of claim 1, wherein the detected minutia patterns include ridge bifurcations and ridge endings.

15. A non-transitory computer readable information storage media having stored thereon instructions that, when executed by one or more processors, cause to be performed a method comprising:

detecting, by a processor, minutia patterns in a probe image;

defining, by the processor, one or more tokens that represent the minutia patterns detected in the probe image, wherein the minutia patterns are divided into a number of categories, and the tokens represent the categories of the different minutia patterns in the probe image and further wherein the detected minutia patterns are represented as vectors, and each vector is quantized to generate one of the defined tokens;

measuring, by the processor, a degree of similarity between the probe image and each gallery image by comparing a probability of occurrence of a set of the tokens defined for the probe image with a probability of occurrence of the set of tokens in that gallery image, wherein measuring the degree of similarity between the probe image and each gallery image includes:

representing the probe image and each gallery image as normalized sparse M-dimensional histograms, where M is a number of different tokens possibly occurring in the probe image, and computing a score for each gallery image by performing a dot product of the sparse M-dimensional histogram of the probe image with the sparse M-dimensional histogram of that gallery image;

combining the sparse M-dimensional histograms of the gallery images in a single table having M table entries, wherein each table entry stores a particular one of the tokens possibly occurring in the probe image, and a frequency of occurrence of the particular one of the tokens in each gallery subject; and identifying and outputting, by the processor, an indication of a candidate for a match to the probe image each gallery image for which the measured degree of similarity satisfies a criterion.

16. The media of claim 15, wherein a similarity between two fingerprint images is measured as a dot product between their histogram representation.

17. A computing system configured to communicate with a database containing gallery images, the computing system comprising:

memory storing computer readable program code that, when executed, searches through gallery images for an identification match to a probe image; and a processor that, in response to executing the computer readable program code stored in the memory:

detects minutia patterns in a probe image;

defines one or more tokens that represent the minutia patterns detected in the probe image, wherein the minutia patterns are divided into a number of categories, and the tokens represent the categories of the different minutia patterns in the probe image and further wherein the detected minutia patterns are represented as vectors, and each vector is quantized to generate one of the defined tokens;

measures a degree of similarity between the probe image and each gallery image by comparing a probability of occurrence of a set of the tokens defined for the probe image with a probability of occurrence of the set of tokens in that gallery image, wherein measuring the degree of similarity between the probe image and each gallery image includes: representing the probe image and each gallery image as normalized sparse M-dimensional histograms, where M is a number of different tokens possibly occurring in the probe image, and computing a score for each gallery image by performing a dot product of the sparse M-dimensional histogram of the probe image with the sparse M-dimensional histogram of that gallery image;

combines the sparse M-dimensional histograms of the gallery images in a single table having M table entries, wherein each table entry stores a particular one of the tokens possibly occurring in the probe image, and a frequency of occurrence of the particular one of the tokens in each gallery subject; and identifies and outputs an indication of a candidate for a match to the probe image each gallery image for which the measured degree of similarity satisfies a criterion.

18. The computing system of claim 17, wherein a similarity between two fingerprint images is measured as a dot product between their histogram representation.

19. The computing system of claim 18, wherein each table entry is associated with a list of zero, one, or more gallery images that contain the possibly occurring token represented by that table entry.

20. The computing system of claim 19, further associating a number with each gallery image appearing in a given list of gallery images associated with a given table entry, the number representing the frequency of occurrence in that gallery image of the token represented by the given table entry.

* * * * *